(12) United States Patent
Martini (10) Patent No.: US 9,049,231 B2
(45) Date of Patent: *Jun. 2, 2015

(54) LOCATION BASED NETWORK USAGE POLICIES

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,315

(22) Filed: May 1, 2014

(65) Prior Publication Data

US 2015/0026240 A1 Jan. 22, 2015

Related U.S. Application Data

(63) Continuation of application No. 13/944,585, filed on Jul. 17, 2013, now Pat. No. 8,738,791.

(51) Int. Cl.
*G06F 15/16* (2006.01)
*H04L 29/08* (2006.01)
*H04L 29/06* (2006.01)

(52) U.S. Cl.
CPC ............... *H04L 67/16* (2013.01); *H04L 67/42* (2013.01)

(58) Field of Classification Search
CPC ........ H04L 63/102; H04L 67/16; H04L 67/42
USPC .......................................................... 709/229
See application file for complete search history.

(56) References Cited

U.S. PATENT DOCUMENTS

| 5,797,128 | A | * | 8/1998 | Birnbaum .............................. 1/1 |
| 5,872,928 | A | | 2/1999 | Lewis et al. |
| 6,466,932 | B1 | | 10/2002 | Dennis et al. |
| 7,263,719 | B2 | | 8/2007 | Jemes et al. |

(Continued)

FOREIGN PATENT DOCUMENTS

| WO | 9626588 | 8/1996 |
| WO | 2008134291 | 11/2008 |
| WO | WO 2009146405 A1 * | 12/2009 |

OTHER PUBLICATIONS

International Search Report and Written Opinion issued in International Application No. PCT/US2014/038275, mailed Aug. 11, 2014, 10 pages.

(Continued)

*Primary Examiner* — Kostas Katsikis
(74) *Attorney, Agent, or Firm* — Fish & Richardson P.C.

(57) ABSTRACT

Methods, systems, and apparatus, including computer programs encoded on computer storage media, for location based network usage policies. One of the methods includes storing information defining a plurality of network policy groups, receiving first information indicating that a client device is connected to the network at a first physical location, and identifying a first user role associated with the client device, identifying, from among the plurality of network policy groups, a first network policy group having both (i) an associated first policy location that corresponds to the client device's first physical location, and (ii) an associated policy role that corresponds to the client device's first user role, and regulating the client device's access to resources available on the network based on the one or more network usage policies associated with the identified first network policy group.

27 Claims, 5 Drawing Sheets

(56) References Cited

U.S. PATENT DOCUMENTS

| | | | |
|---|---|---|---|
| 8,320,883 B2 | 11/2012 | Watson et al. | |
| 8,392,585 B1 | 3/2013 | Balwani | |
| 8,539,544 B2* | 9/2013 | Garimella et al. | 726/1 |
| 8,549,584 B2 | 10/2013 | Singh et al. | |
| 8,554,180 B2 | 10/2013 | Watson et al. | |
| 8,856,865 B1* | 10/2014 | Martini | 726/1 |
| 2001/0042213 A1 | 11/2001 | Jemes et al. | |
| 2002/0066033 A1 | 5/2002 | Dobbins et al. | |
| 2003/0217151 A1 | 11/2003 | Roese et al. | |
| 2004/0059811 A1 | 3/2004 | Sugauchi et al. | |
| 2005/0193093 A1 | 9/2005 | Mathew et al. | |
| 2007/0207818 A1 | 9/2007 | Rosenberg et al. | |
| 2007/0261121 A1 | 11/2007 | Jacobson | |
| 2008/0271109 A1 | 10/2008 | Singh et al. | |
| 2009/0265327 A1 | 10/2009 | Zou | |
| 2010/0257264 A1 | 10/2010 | Assadzadeh | |
| 2011/0043371 A1 | 2/2011 | German et al. | |
| 2011/0153854 A1 | 6/2011 | Chickering | |
| 2011/0161253 A1 | 6/2011 | Ma et al. | |
| 2011/0162033 A1 | 6/2011 | Feinstein et al. | |
| 2012/0023546 A1 | 1/2012 | Kartha et al. | |
| 2013/0007257 A1* | 1/2013 | Ramaraj et al. | 709/224 |
| 2013/0007848 A1 | 1/2013 | Chaskar et al. | |
| 2013/0086249 A1* | 4/2013 | White et al. | 709/224 |
| 2013/0297662 A1 | 11/2013 | Sharma et al. | |
| 2013/0332685 A1* | 12/2013 | Kripalani et al. | 711/162 |
| 2014/0343989 A1* | 11/2014 | Martini | 705/7.17 |

OTHER PUBLICATIONS

'Network Configuration Manager_NCM_SolarWinds' [online]. "Automated Network Configuration & Compliance Management," [retrieved on Jul. 15, 2013]. Retrieved from the Internet:<URL: http://www.solarwinds.com/network-configuration-manager.aspx> 3 pages.

'ClearPass Aruba Networks' [online]. "One place to manage all things BYOD," [retrieved on Jul. 15, 2013]. Retrieved from the Internet:URL:http://www.arubanetworks.com/products/clearpass 2 pages.

'Cisco Identity Services Engine User Guide, Release 1.1' [online]. "Managing Network Devices," [retrieved on Jul. 15, 2013]. Retrieved from the Internet:URL:http://cisco.com/en/US/docs/security/ise/1.1/user_guide/ise_man_network_devices.html 9 pages.

* cited by examiner

LOCATION BASED NETWORK USAGE POLICIES

TECHNICAL FIELD

This specification relates to systems and techniques that facilitate applying access policies across different network services and products based, for example, on a user's physical location.

BACKGROUND

Directory services for organizing network users into groups are often used in computer network environments. Some directory services include Active Directory, OpenDirectory, eDirectory, and OpenLDAP, among others. Each directory service serves a common purpose of organizing computer users on a network into user groups and organizational units (Otis) depending on a user's role in an organization. Users with the similar policies and organizational roles, such as employees, managers, network administrators, are typically placed into the same user group or OU within the directory service.

Typical items stored within the directory include identities of the users allowed to log into the network, and the computers that are registered within the organization. Each user record, for example, contains many details about the user including the user's computer login name, email address, phone number, user roles within the organization, and full name.

Some directory services are based on a common platform called Lightweight Directory Access Protocol (LDAP), which provides a common method for communication between directory service products developed by different vendors, such as Active Directory (a product by Microsoft Corporation) or eDirectory (a product by Novell, Inc.). Typically, either the internal core of a vendor's directory server implementation is LDAP, or the vendor provides an LDAP networking interface to allow a first directory server to access information contained within a second directory server developed by another vendor.

Due to the fact that directory services contain such detailed information about each user on the network, a directory service becomes a critical source of information to other network services and products on a network that rely on this information to provide network services,

SUMMARY

In general, one aspect of the subject matter described in this specification can be embodied in methods that include the actions of storing information defining a plurality of network policy groups, each network policy group having an associated policy location, an associated policy role, and one or more network usage policies that specify access permissions for resources available on a network, receiving first information indicating that a client device is connected to the network at a first physical location, and identifying a first user role associated with the client device, identifying, from among the plurality of network policy groups, a first network policy group having both (i) an associated first policy location that corresponds to the client device's first physical location, and (ii) an associated policy role that corresponds to the client device's first user role, and regulating the client device's access to resources available on the network based on the one or more network usage policies associated with the identified first network policy group. Other implementations of this aspect include corresponding computer systems apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. In some implementations, identifying the first network policy group comprises identifying a subset of network policy groups for the client device, each of the network policy groups in the subset of network policy groups having priority information and being one of the network policy groups in the plurality of network policy groups, wherein the policy location for each of the network policy groups in the subset of network policy groups matches the first physical location, comparing the priority information associated with each of the network policy groups from the subset of network policy groups, and selecting a highest priority network policy group from the subset of network policy groups as the first network policy group, the highest priority network policy group having a higher priority than the other network policy groups in the subset of network policy groups based on the priority information associated with the highest priority network policy group.

In some implementations, the method comprises receiving, from the client device while the client device is associated with the first physical location, a first resource request to access a resource available on the network, wherein regulating the client device's access to resources available on the network based on the one or more network usage policies associated with the identified first network policy group comprises determining, while the client device is associated with the first physical location and based on receiving the first resource request, first access permissions for the client device to the requested resource based on the one or more network usage policies associated with the identified first network policy group. The first resource request may comprise the first information. The method may comprise receiving second information indicating that the client device is connected to the network at a second physical location, and identifying a second user role, the second physical location of the client device different from the first physical location, identifying, from among the plurality of network policy groups, a second network policy group having both (i) an associated second policy location that corresponds to the client device's second physical location, and (ii) an associated policy role that corresponds to the client device's second user role, receiving, from the client device while the client device is associated with the second physical location, a second resource request to access the resource, and determining, while the client device is associated with the second physical location and based on receiving the second resource request, second access permissions for the client device to the requested resource based on the one or more network usage policies associated with the identified second network policy group.

In some implementations, the second network policy group is a default network policy group that applies to all client devices that connect to the network at the second physical location. The second network policy group may be more restrictive than the first network policy group for at least some of the resources available on the network.

In some implementations, receiving the first information comprises receiving, from a specific network connection point on the network, client device information indicating that the client device is connected to the specific network connection point, wherein a plurality of network connection points provide access to the network and each network connection point is associated with a network connection point location, the specific network connection point location associated with the specific network connection point identifying the first physical location, and the specific network connection point being one of the plurality of network connection points. Each of the network policy groups in the plurality of network policy groups may be linked to one of a plurality of user roles based on a network policy group name associated with the linked network policy group matching a user role name associated with the linked user role, the first user role associated with the client device being one of the plurality of user roles. The first policy location and the first physical location may both comprise the same location name.

The subject matter described in this specification may be implemented in various implementations to realize one or more of the following potential advantages. In various implementations, a network applies different network usage policies to similar resource requests based on a network connection point of the requesting client device, and/or a physical location of the requesting client device. Alternatively, or in addition, a network identifies resources responsive to a network resource request based on a network connection point of the requesting client device, and/or a physical location of the requesting client device. As a result, different usage policies may be applied, and/or different resources may be made available to a user, depending on the user's physical location within an enterprise's facility or other environment.

Details of one or more implementations are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

A network may apply a network usage policy for a client device that is requesting access to a network resource to determine whether or not the client device may access the requested resource and whether the requested type of access is allowed. The network may apply the same network usage policy to the client device without consideration of the physical location of the client device.

To allow network administrators to apply different usage policies to the same client device depending on the physical location of the client device, a network may identify a connection point to which the client device connects to determine a physical location associated with the client device, and apply different usage policies to network resource requests received from the client device depending on the physical location associated with the client device.

For example, an access control server on the network may determine whether the client device is located in the user's office or in a conference room, based on the network connection point to which the client device connects, and apply a network usage policy to requests receives from the client device based on the determined location. In one example, the access control server may apply a more restrictive network usage policy when the client device is located in a conference room, in comparison to that applied when the client device is located in a user's office, to reduce the likelihood that the user will be distracted during a meeting. For example, when the client device is location in a conference room (and thus presumably attending a meeting), the access control server may prevent the client device from accessing resources such as social media websites, email, and the like based on the premise that the user should be paying attention to the meeting and not, for example, reading email or surfing social media websites during the meeting.

Figure 1A:
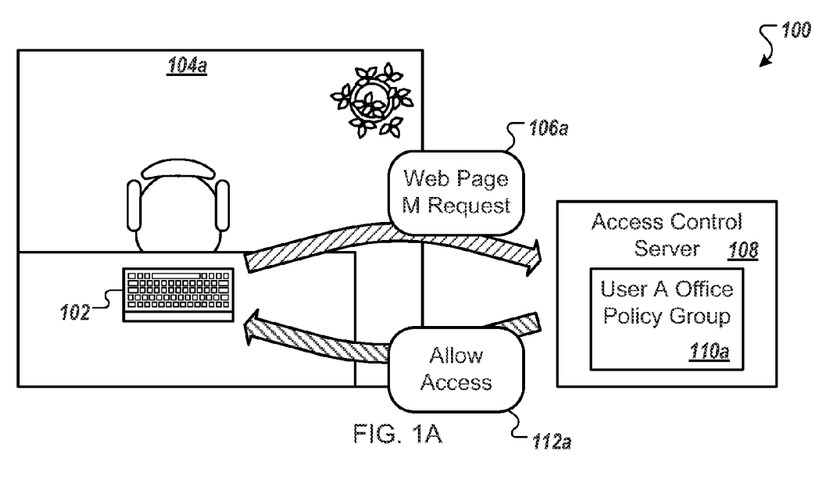
FIGS. 1A-B are an example of a network system configured to apply different network usage policies to resource requests depending on a physical location of a client device sending the requests.
Figure 1B:
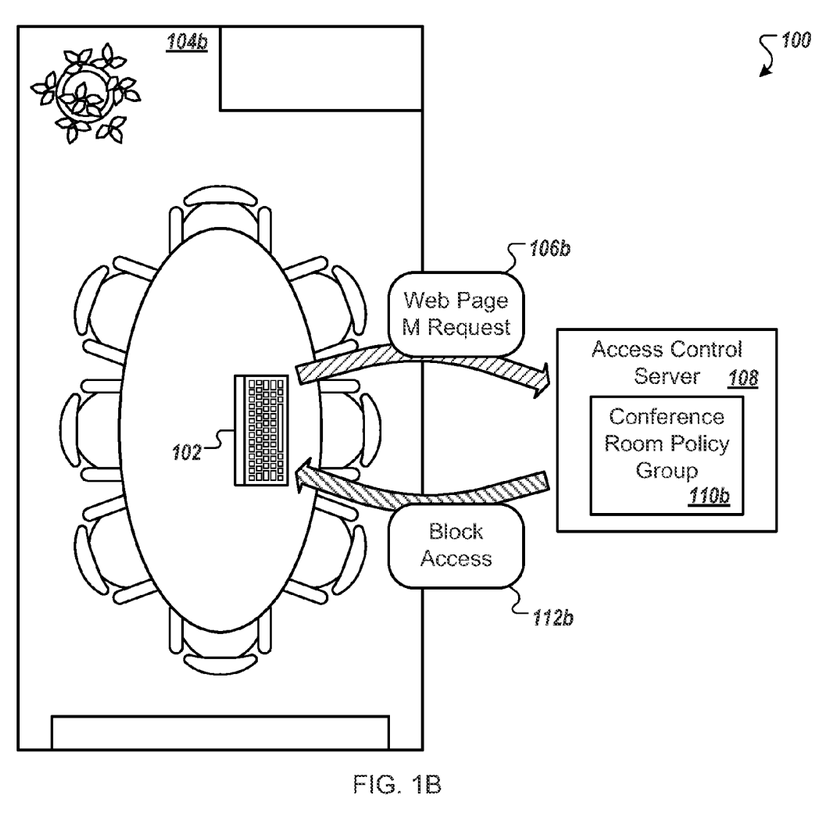

FIGS. 1A-B are an example of a network system 100 configured to apply different network usage policies to resource requests depending on a physical location of a client device 102 sending the requests. For example, when the client device 102 is physically located in a user's office 104a, as shown in FIG. 1A, the client device 102 may send a web page M request 106a to an access control server 108. The access control server 108 identifies a user A office policy group 110a associated with the client device 102 and the physical location of the client device 102, here the user's office 104a, and determines whether to allow the client device 102 to access the requested web page M.

In this example, the policies included in the user A office policy group 110a indicate that the client device 102 may present the requested web page M to a user and the access control server 108 allows 112a the client device 102 to access to the requested web page M. The access control server 108 may allow the client device 102 to access the requested web page M by sending the client device 102 instructions to contact the requested web page M (e.g., when the access control server 108 is also a domain name server). The access control server 108 may use any appropriate algorithm to allow the client device 102 to access the requested web page M.

If, however, the client device 102 is physically located in a conference room 104b, as shown in FIG. 1B, and the client device 102 sends a web page M request 106b to the access control server 108, the access control server 108 identifies a conference room policy group 110b associated with the client device 102 and the physical location of the client device 102. The access control server 108 applies the network usage policies in the conference room policy group 110b to the web page M request 106b, determines that the client device 102 should not have access to the requested web page M, and blocks 112b the client device's 102 access to the requested web page M.

For example, the access control server 108 determines that the client device 102 is connected to a wireless network connection point that is physically located in the conference room 104b and that the client device 102 should not have access to the web page M to which the client device 102 has access when the client device is physically located in the user's office 104a. The access control server 108 may block access 112b to the requested web page M by not forwarding the web page M request 106b to a server hosting the web page M. The access control server 108 may use any appropriate algorithm to block the client device's 102 access to the requested web page M.

The network system 100 may apply a more restrictive conference room policy group 110b when the client device 102 is physically located in the conference room 104b, compared to when the client device 102 is physically located in the user's office 104a, to reduce the likelihood that a user of the client device 102 will be distracted during a meeting in the conference room 104b. Alternatively, the network system 100 may apply a less restrictive conference room policy group 110b when the client device 102 is physically located in the conference room 104b, compared to when the client device 102 is physically located in the user's office 104a, to allow the client device 102 access to additional resources that may be required by the user of the client device 102 during the meeting in the conference room 104b. For example, the client device 102 may retrieve a news article that is relevant to the meeting discussion that the client device 102 would not need to have access to and/or should not be allowed to access when physically located in the user's office 104a.

In some implementations, the access control server 108 sends the client device 102 a message that indicates that the client device 102 may access the requested web page M. In certain implementations, the access control server 108 allows the client device 102 to access the requested web page M by not sending a spoofed response to the client device 102 based on the web page M request 106a.

In some implementations, the access control server sends the client device 102 a message that indicates that the client device 102 may not access the requested web page M (e.g., as the block access message 112b). In certain implementations, the access control server 108 sends a spoofed response to the client device 102 to prevent the client device 102 from presenting the web page M to a user.

Figure 2:
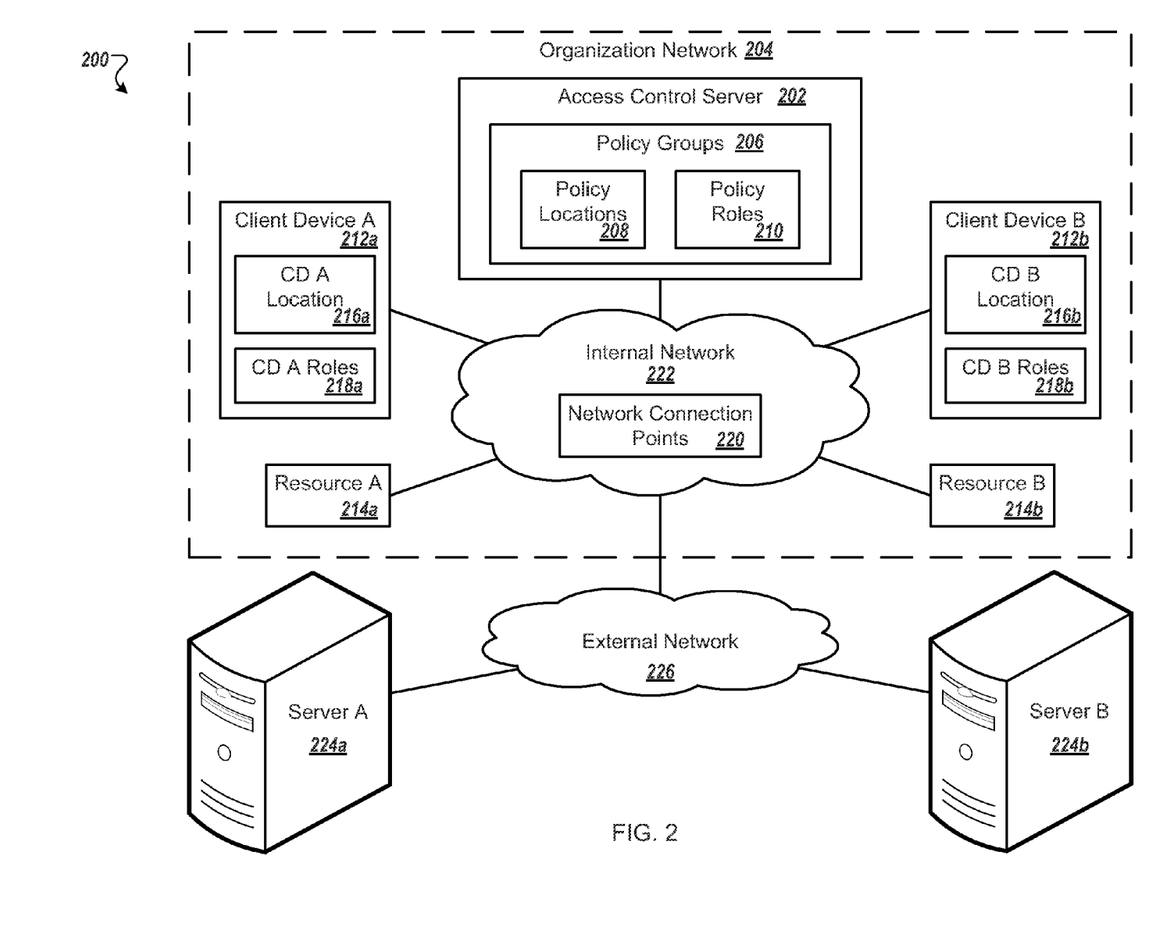
FIG. 2 is a block diagram of an environment in which an access control server applies network usage policies for an organization network based on a physical location of a network device that requests access to a network resource.

FIG. 2 is a block diagram of an environment 200 in which an access control server 202 applies network usage policies for an organization network 204 based on a physical location of a network device that requests access to a network resource. For example, the access control server 202 includes a plurality of network policy groups 206 that each include a policy location 208 and a policy role 210. When a client device A 212a requests access to a resource A 214a, the access control server 202 compares a client device A location 216a and one or more client device A rotes 218a with the policy locations 208 and the policy roles 210, respectively, to identify one of the network policy groups 206 that is associated with the access request.

For example, the access control server 202 receives a request from the client device A 212a asking for access to the resource A 214a, such as a printer. The access control server 202 determines the physical location of the client device A 212a, for example by identifying a network connection point 220 to which the client device A 212a currently connects for access to an internal network 222 of the organization network 204. The access control server 202 determines the client device A roles 218a associated with the client device A 212a. For example, the access control server 202 may receive the client device A roles 218a from the client device A 212. Alternatively, the access control server 202 may receive the client device A roles 218a from a directory service.

The access control server 202 compares the client device A location 216a and the client device A roles 218a with the policy locations 208 and the policy roles 210, respectively, to identify a particular policy group from the network policy groups 206 that is associated with the request received from the client device A 212a. For example, the access control server 202 identifies all of the policy groups that are associated with the client device A 212a and have a policy location 208 that matches the current client device A location 216a as a subset of policy groups from the network policy groups 206.

The access control server 202 selects the highest ranked policy group from the subset of policy groups and regulates the access of the client device A 212a to the resource A 214a based on the highest ranked policy group. For example, if the client device A 212a is associated with multiple user roles, such as a Managers role and a Marketing role, the access control server 202 determines which role has a higher priority and applies one or more network usage policies from the higher priority policy group to the request for access to the resource A 214a.

The organization network 204 includes a plurality of client devices 212a-b each of which are associated with a physical location and one or more user roles (e.g., based on the users operating the client devices). The client devices 212a-b may include personal computers, mobile communication devices, and other devices that can send and receive data over the internal network 222. The internal network 222, such as a local area network (LAN), wide area network (WAN), the Internet, or a combination thereof connects the client devices 212a-b, the access control server 202, and the resources 214a-b.

In one example, when the client device A 212a is a laptop, the access control server 202 determines that the client device A 212a is physically located at a specific desk or in a specific office based on the network connection point 220, such as a network bridge, to which the client device A 212a is physically connected with an Ethernet cable. In another example, the access control server 202 determines that the client device A 212a is physically located in a conference room based on an IEEE 802.11 wireless network connection between the client device A 212a and the network connection point 220, such as a wireless router.

The policy locations may include specific locations, such as "Conference Room B," or general locations, such as "User's office." For example, when both the client device A 212a and the client device B 212b are associated with the location "Conference Room B" and belong to the "Marketing" user role, the access control server applies network usage policies from a Conference Room B—Marketing Policy Group to resource requests from either of the client devices.

Continuing the example, when the client device A 212a is associated with the user A's office and the access control server 202 receives a first resource request from the client device A 212a, the access control server 202 may apply a User Office—Marketing Policy Group to the first resource request. Further, when the client device B 212b is associated with the user B's office, which may or may not be a different physical office than the user A's office but is associated with the same type of work as the user A's office, and the access control server 202 receives a second resource request from the client device B 212b, the access control server 202 applies the same User Office—Marketing Policy Group to the second resource request as the policy group that was applied to the first resource request.

In another example, when the client device A 212a and the client device B 212b are associated with different user roles, the policy groups associated with the client devices 212a-b may be different even if both client devices are associated with the same physical location. For example, if the client device A 212a is associated with a Managers user role (i.e., as a highest ranked user role) and the client device B 212b is associated with a Marketing user role and both client devices 212a-b are associated with the Conference Room B, then the access control server 202 may identify different policies groups for the client devices 212a-b, such as a Conference Room Managers Policy Group for the client device A 212a and a Conference Room Marketing Policy Group.

In this example, the client devices 212a-b are associated with the same policy group regardless of the actual conference rooms that the client devices 212a-b are physically located in. For example, the access control server 202 associates the client device A 212a with the Conference Room—Managers Policy Group when the client device A 212a is associated with the Conference Room B or another conference room associated with the organization network 204.

In some implementations, the access control server 202 associates a client device with a different policy group when the client device is in a different room of the same type. For example, the access control server 202 may associate the client device A 212a with a Conference Room C—Managers Policy Group when the client device A 212a is located in the Conference Room C and the client device A 212a with a General Conference Room—Managers Policy Group when the client device A 212a is located in either the Conference Room A or the Conference Room B.

The access control server 202 may also regulate the access of the client devices 212a-b to external resources that are located outside of the organization network 204. For example, the access control server 202 may receive a request from the client device A 212a for access to one or more servers 224a-b that connect to the organization network 204 through an external network 226. After receiving a request for an external resource, the access control server 202 regulates the access of the client devices 212a-b to the external resources in a manner similar to the access regulation for the internal resources 214a-b.

In some implementations, the access control server 202 identifies a network policy group associated with one of the client devices 212a-b when the respective client device connects to the internal network 222. For example, when the client device A 212a connects to one of the network connection points 220, the access control server 202 may select one of the network policy groups 206 to apply to communications to and from the client device A 212a based on the client device A location 216a and the client device A roles 218a.

In some implementations, a device in the organization network 204 different from the access control server 202 regulates the access of the client devices 212a-b to one or more resources. For example, the resource A 214a may regulate the access of the client devices 212a-b to the resource A 214a.

In implementations where the client devices 212a-b do not send resource requests to the access control server 202, the access control server 202 may send the client devices 212a-b one or more block resource responses to prevent the client devices 212a-b from presenting requested content to a user. For example, the client device A 212a may send a resource request for a web page M to a network gateway that forwards the resource request to the access control server 202 and the server A 224a that hosts the web page M.

Continuing the example, the access control server 202 identifies a policy group for the client device A 212a and applies one or more network usage policies from identified policy group to the resource request for the web page M. If the access control server 202 determines, based on the network usage policies, that the client device A 212a is allowed to access the web page M, the access control server 202 allows the client device A 212a to receive a response from the server A 224a and takes no further action. If, however, the access control server 202 determines that the web page M includes content that should not be presented to a user, the access control server 202 sends a block content response to the client device A 212a to prevent the client device A 212a from presenting the web page M to a user.

In some implementations, the access control server 202 utilizes the physical locations of the client devices 212a-b to determine resources responsive to resource requests received from the client devices 212a-b. For example, the client device A 212a may send a request to the access control server 202 to print a document. The access control server 202 may use the client device A location 216a and the client device A roles 218a to identify a physical printer that is physically located close to the client device A location 216a and is accessible to the client device A 212a based on the client device A roles 218a, and prints the document on the identified physical printer. This allows the client device A 212a to print a document from multiple different physical locations associated with the organization network 204 where the access control server 202 automatically determines the printer that is closest to the client device A 212a without requiring a user to select a specific physical printer.

In some implementations, each of the network policy groups in the plurality of network policy groups 206 is linked to one of a plurality of user rotes based on the human readable names associated with the network policy groups 206. For example, the organization network 204 links a specific network policy group with a specific user role when the name of the specific network policy group matches the name of the specific user role. In these implementations, the access control server 202 determines the network policy group associated with the client devices 212a-b based on the names of the client device roles 218a-b that match the names of the network policy groups 206.

In some implementations, the user roles associated with the client devices 212a-b include a user group. In certain implementations, the user roles associated with the client devices 212a-b include an organizational unit.

Figure 3:
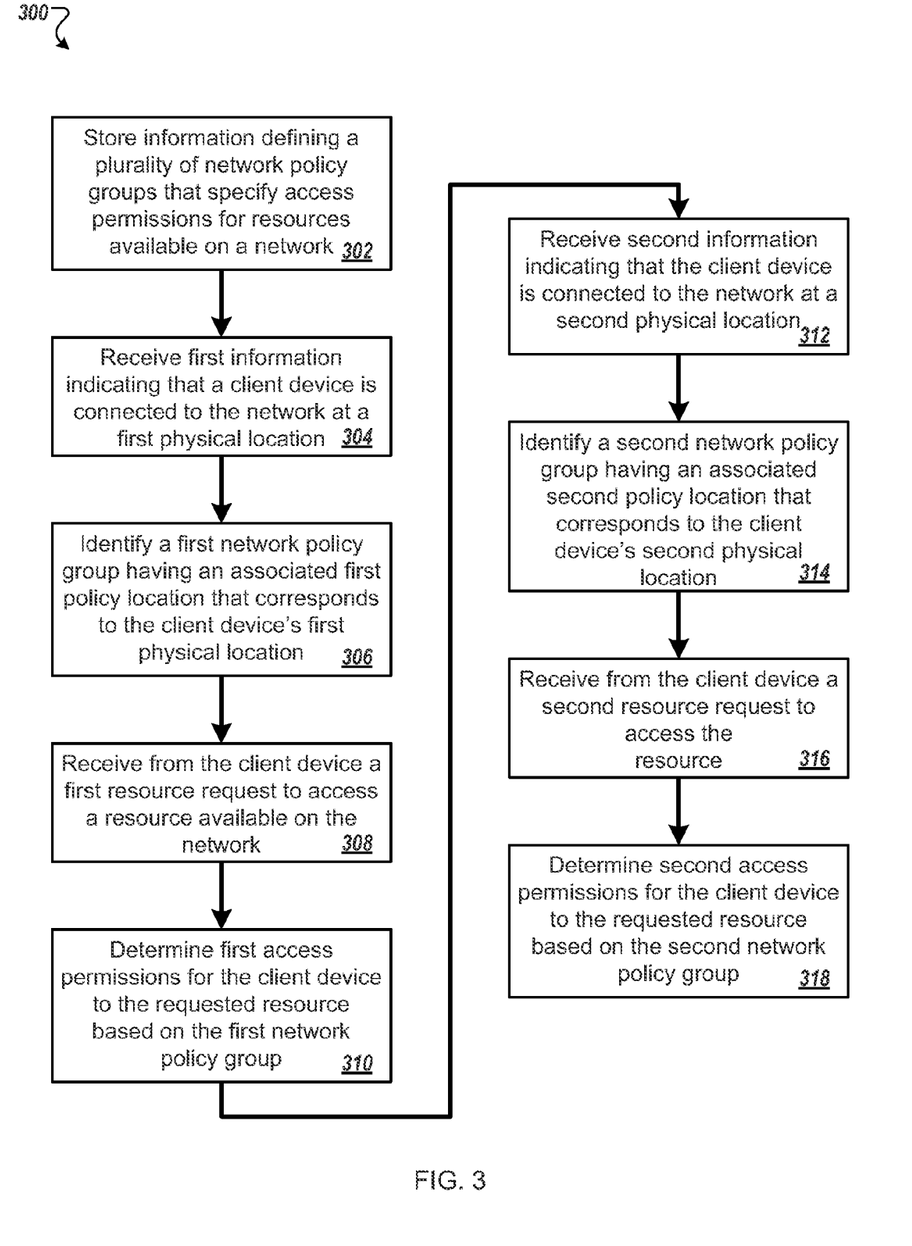
FIG. 3 is a flow diagram of a process for regulating access to resources available on a network based on a physical location of a client device requesting access to the resources.

FIG. 3 is a flow diagram of a process 300 for regulating access to resources available on a network based on a physical location of a client device requesting access to the resources. The process 300 can be used by the access control server 202 from the environment 200.

The access control server stores information defining a plurality of network policy groups that specify access permissions for resources available on a network (302). Each network policy group has an associated policy location, an associated policy role, and one or more network usage policies that specify access permissions for resources available on a network. For example, the access control server stores the information in a database included on the access control server.

The access control server receives first information indicating that a client device is connected to the network at a first physical location (304). The first information identifies a first user role associated with the client device. For example, the access control server determines that the client device recently connected to the network and is located at the first physical location, such as an office of the user operating the client device, based on the network connection point that provides network access to the client device. The access control server may also determine that the client device belongs to a Marketing user role.

The access control server identifies a first network policy group having an associated first policy location that corresponds to the client device's first physical location (306). The first network policy group also has an associated policy role that corresponds to the client device's first user role. For example, the access control server determines that the first network policy group has the same human readable location name as the first physical location, and the same human readable policy name as the user role name. In one example, the access control server identifies a User Office—Marketing Policy Group.

The access control server receives, from the client device, a first resource request to access a resource available on the network (308). The access control server receives the first resource request while the client device is associated with the first physical location. For example, the access control server receives a request Dora web page from the client device while the client device is physically located in the user's office.

In some implementations, the access control server hosts the requested resource. For example, the client device may request an intranet web page from the access control server. In one example, the access control server may be included in a printer and regulate the client device's access to the printer.

The access control server determines first access permissions for the client device to the requested resource based on the first network policy group (310). The access control server determines the first access permissions for the client device while the client device is associated with the first physical location. The first access permissions for the client device to the requested resource are based on the one or more network usage policies associated with the identified first network policy group.

For example, the access control server regulates the client device's access to resources available on the network based on the one or more network usage policies associated with the identified first network policy group. In one example, the access control server identifies a network usage policy from the User Office—Marketing Policy Group that is associated with the requested web page and applies access permissions from the identified network usage policy to the first resource request for the web page.

The access control server receives second information indicating that the client device is connected to the network at a second physical location (312). The second information identifies a second user role associated with the client device. The second physical location is different from the first physical location. For example, the access control server determines that the client device is currently physically located in a conference room and no longer located in the user's office.

In some implementations, the second user role is different than the first user role. For example, the access control server may determine that a Marketing user role applied to the client device while the client device was physically located in the user's office and that an "Everyone" user role applies to the client device while the client device is physically located in the conference room. Alternatively, the access control server may determine that the second user role is the same as the first user role.

The access control server identifies a second network policy group having an associated second policy location that corresponds to the client device's second physical location (314). The second network policy group has an associated policy role that corresponds to the client device's second user role. For example, the access control server identifies a Conference Room—Everyone Policy Group associated with the client device while the client device is physically located in the conference room.

The access control server receives, from the client device, a second resource request to access the resource (316). The access control server receives the second resource request while the client device is associated with the second physical location. For example, while the client device is physically located in the conference room, the access control server receives another request from the client device for access to the same web page the client device previously requested access to while the client device was physically located in the user's office.

The access control server determines second access permissions for the client device to the requested resource based on the second network policy group (318). The access control server determines the second access permissions for the client device while the client device is associated with the second physical location. The second access permissions for the client device to the requested resource are based on the one or more network usage policies associated with the identified second network policy group.

For example, the access control server regulates the client device's access to resources available on the network based on the one or more network usage policies associated with the Conference Room—Everyone Policy Group. The regulation of the client device's access to resource available on the network may be the same as or different from the regulation based on the User Office—Marketing Policy Group. For example, the second access permissions may allow the client device to access some resources that were not accessible to the client device based on the first access permissions and may prevent the client device from accessing other resources that were available to the client device based on the first access permissions.

In some implementations, the second network policy group is more restrictive than the first network policy group for at least some of the resources available on the network. For example, the access control server may allow the client device to access the requested web page in step 310 based on the first network policy group but prevent the client device from accessing the requested web page in step 318 based on the second network policy group.

In certain implementations, the first network policy group is more restrictive than the second network policy group for at least some of the resources available on the network. For example, the access control server may prevent the client device from accessing the requested web page in step 310 based on the first network policy group and allow the client device to access the requested web page in step 318 based on the second network policy group.

In some implementations, the second network policy group is a default policy group that applies to all client devices that connect to the network at the second physical location. For example, the second network policy group applies to everyone in the organization network and all devices that connect to the internal network when those devices are associated with the second physical location. Alternatively, the second network policy group is associated with a subset of users and client devices included in the organization network.

The order of steps in the process 300 described above is illustrative only, and the regulating of access to the resources available on the network based on the physical location of the client device requesting access to the resources can be performed in different orders. For example, the access control server may receive the first request prior to identifying the first network policy group.

In some implementations, the process 300 can include additional steps, fewer steps, or some of the steps can be divided into multiple steps. For example, the access control server may store information defining the plurality of network policy groups, receive the first information, identify the first network policy group, and regulate the client device's access to resources available on the network (i.e., perform steps 302-306, and 310) without performing one or more of the other steps in the process 300.

In some implementations, the first resource request includes the first information. For example, the access control server may receive the first resource request where the first resource request includes the first information indicating that the client device is connected to the first physical location.

Figure 4:
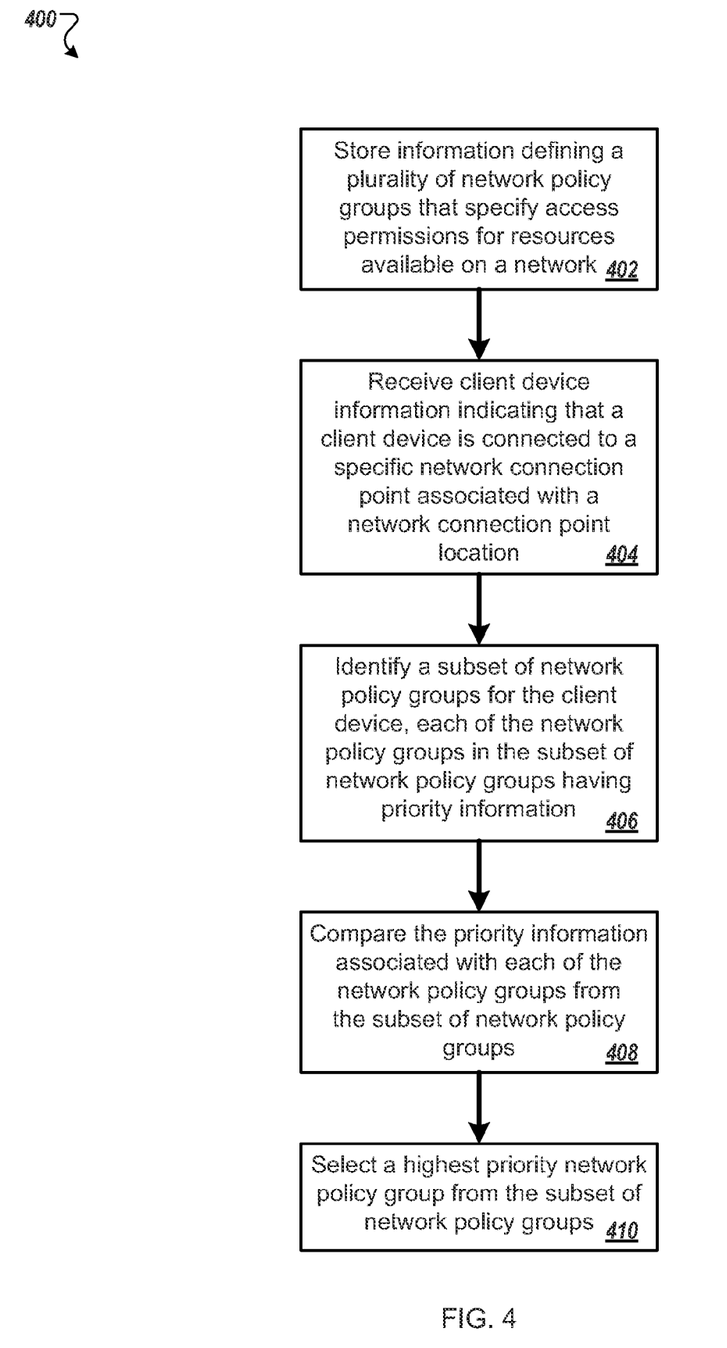
FIG. 4 is a flow diagram of a process for selecting a highest priority network policy group.

FIG. 4 is a flow diagram of a process 400 for selecting a highest priority network policy group. The process 400 can be used by the access control server 202 from the environment 200.

The access control server stores information defining a plurality of network policy groups that specify access permissions for resources available on a network (402). For example, the access control server stores the plurality of network policy groups as described above with reference to step 302.

The access control server receives client device information indicating that a client device is connected to a specific network connection point associated with a specific network connection point location (404). A plurality of network connection points provide access to the network and each network connection point is associated with a network connection point location where the specific network connection point is one of the plurality of network connection points. For example, the client device connects to a wireless modem and the wireless modem provides the client device information to the access control server, including information representing a physical location associated with the wireless modem.

In some implementations, the network connection point provides domain specific information associated with the client device to the access control server. For example, when the client device connects to a wireless router, the wireless router may append "@ConferenceRoomB" to a user role name associated with the client device when the wireless router is associated with Conference Room B.

Alternatively, the access control server may determine domain specific information for the client device based on the network connection point from which the access control server receives resource requests. For example, the access control server may include a list of domain information that associates requests from a network bridge with a first domain (e.g., "@office"), and requests from a wireless router with a second domain "@ConferenceRoomB"). Based on the network connection point from which the access control server receives a request, the access control server appends the corresponding domain information to the user role name associated with the request.

The access control server identifies a subset of network policy groups for the client device, where each of the network policy groups in the subset of network policy groups has priority information (406). Each of the network policy groups in the subset of network policy groups is one of the network policy groups in the plurality of network policy groups, and the policy location for each of the network policy groups in the subset of network policy groups matches the network connection point location. For example, the policy locations for the network policy groups in the subset of network policy groups match the network connection point location (e.g., "(@ConferenceRoomB").

In some implementations, the policy locations and the network connection point location both comprise the same location name. Alternatively, the access control server may use any other appropriate information to represent the policy locations and the network connection point location.

The access control server compares the priority information associated with each of the network policy groups from the subset of network policy groups (408). For example, the access control server determines which of the network policy groups from the subset of network policy groups is associated with a priority greater than the priorities of the other network policy groups in the subset of network policy groups. In one example, the access control server determines that a Marketing policy group is associated with the highest priority.

The access control server selects a highest priority network policy group from the subset of network policy groups (410). The highest priority network policy group has a higher priority than the other network policy groups in the subset of network policy groups based on the priority information associated with the highest priority network policy group. For example, the access control server regulates the client device's access to resources available on the network based on the one or more network usage policies included in the highest priority network policy group.

In one example, the access control server uses the user role name and the appended domain information to determine a network policy group for the client device. For example, when the client device belongs to a Marketing user rote, the access control server selects a "Marketing@ConferenceRoomB" policy group and applies policies from the "Marketing@ConferenceRoomB" policy group to communications between the client device and servers hosting resources requested by the client device.

In some implementations, the process 400 can include additional steps, fewer steps, or some of the steps can be divided into multiple steps. For example, the access control server may perform the process 400 or a portion of the process 400 in conjunction with the process 300. In these implementations, the specific network connection point location associated with the specific network connection point identifies the first physical location.

Figure 5:
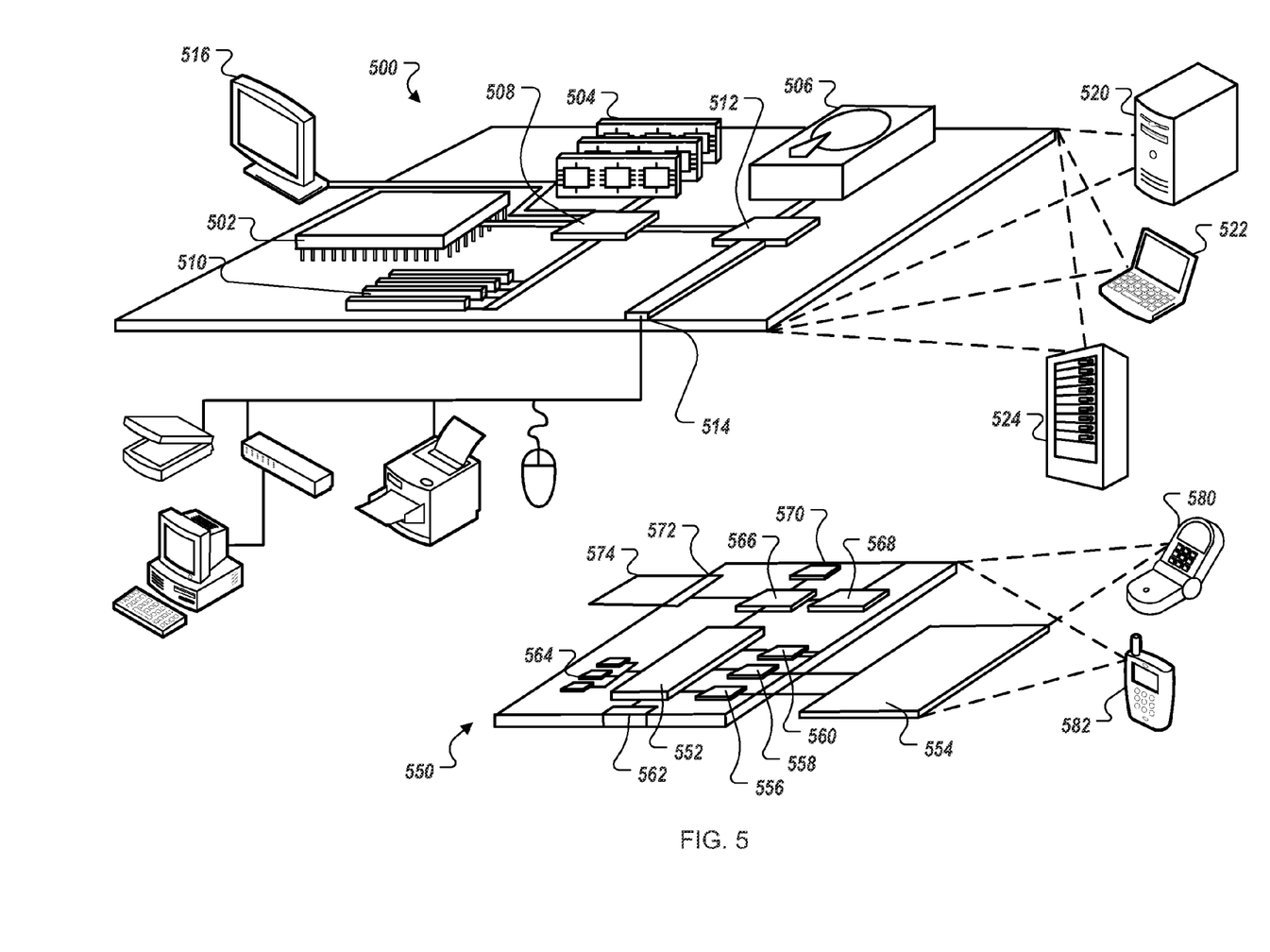
FIG. 5 is a block diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high speed interface 508 connecting to memory 504 and high speed expansion ports 510, and a tow speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high speed controller 508 is coupled to memory 504, display 516 (e.g., through a graphics processor or accelerator), and to high speed expansion ports 510, which may accept various expansion cards (not shown). In the implementation, low speed controller 512 is coupled to storage device 506 and low speed expansion port 514. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 502 may be a CISC (Complex Instruction Set Computers) processor, a RISC (Reduced instruction Set Computer) processor, or a MISC (Minimal instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by a data processing apparatus, the method comprising:

receiving first information indicating that a client device is connected to a network at a first physical location, and identifying a first user role associated with the client device;

identifying, from among a plurality of network policy groups that each has a corresponding policy location and a corresponding policy role, a first network policy group having both (i) a first policy location that corresponds to the client device's first physical location, and (ii) a policy role that corresponds to the client device's first user role;

receiving, from the client device while the client device is associated with the first physical location, a first resource request to access a resource available on the network;

determining, while the client device is associated with the first physical location and in response to receiving the first resource request, first access permissions for the client device to the requested resource using the first network policy group;

receiving second information indicating that the client device is connected to the network at a second physical location, and identifying a second user role associated with the client device, the second physical location different from the first physical location;

identifying, from among the plurality of network policy groups, a second network policy group having both (i) a second policy location that corresponds to the client device's second physical location, and (ii) a policy role that corresponds to the client device's second user role;

receiving, from the client device while the client device is associated with the second physical location, a second resource request to access the resource; and determining, while the client device is associated with the second physical location and in response to receiving the second resource request, second access permissions for the client device to the requested resource using the second network policy group;

wherein identifying the first network policy group further comprises:

identifying a subset of network policy groups for the client device using the first user role and the first physical location, each of the network policy groups in the subset of network policy groups having priority information and being one of the network policy groups in the plurality of network policy groups, wherein the policy location for each of the network policy groups in the subset of network policy groups is the same as the first physical location and the policy role for each of the network policy groups in the subset of network policy groups is the same as the first user role;

comparing the priority information associated with each of the network policy groups from the subset of network policy groups; and selecting a highest priority network policy group from the subset of network policy groups as the first network policy group, the highest priority network policy group having a higher priority than other network policy groups in the subset of network policy groups based on the priority information associated with the highest priority network policy group.

2. The method of claim 1, wherein the first policy location and the first physical location both comprise the same location name.

3. The method of claim 1, wherein the first resource request comprises the first information.

4. The method of claim 1, wherein the second network policy group is a default network policy group that applies to all client devices that connect to the network at the second physical location.

5. The method of claim 1, wherein the second network policy group is more restrictive than the first network policy group for at least some of the resources available on the network.

6. The method of claim 1, wherein the first access permissions allow the client device access to the requested resource and the second access permissions do not allow the client device access to the requested resource.

7. The method of claim 1, wherein receiving the first information comprises:

receiving, from a specific network connection point on the network, client device information indicating that the client device is connected to the specific network connection point, wherein a plurality of network connection points provide access to the network and each network connection point is associated with a network connection point location, the specific network connection point location associated with the specific network connection point identifying the first physical location, and the specific network connection point being one of the plurality of network connection points.

8. The method of claim 7, wherein the specific network connection point comprises a wireless network connection point.

9. The method of claim 1, wherein each of the network policy groups in the plurality of network policy groups is linked to one of a plurality of user roles based on a network policy group name associated with the linked network policy group that is the same as a user role name associated with the linked user role, the first user role associated with the client device being one of the plurality of user roles.

10. A non-transitory computer storage medium encoded with instructions that, when executed by one or more computers, cause the one or more computers to perform operations comprising:

receiving first information indicating that a client device is connected to a network at a first physical location, and identifying a first user role associated with the client device;

identifying, from among a plurality of network policy groups that each has a corresponding policy location and a corresponding policy role, a first network policy group having both (i) a first policy location that corresponds to the client device's first physical location, and (ii) a policy role that corresponds to the client device's first user role; and receiving, from the client device while the client device is associated with the first physical location, a first resource request to access a resource available on the network;

determining, while the client device is associated with the first physical location and in response to receiving the first resource request, first access permissions for the client device to the requested resource using the first network policy group;

receiving second information indicating that the client device is connected to the network at a second physical location, and identifying a second user role associated with the client device, the second physical location different from the first physical location;

identifying, from among the plurality of network policy groups, a second network policy group having both (i) a second policy location that corresponds to the client device's second physical location, and (it) a policy role that corresponds to the client device's second user role;

receiving, from the client device while the client device is associated with the second physical location, a second resource request to access the resource; and determining, while the client device is associated with the second physical location and in response to receiving the second resource request, second access permissions for the client device to the requested resource using the second network policy group;

wherein identifying the first network policy group further comprises:

identifying a subset of network policy groups for the client device using the first user role and the first physical location, each of the network policy groups in the subset of network policy groups having priority information and being one of the network policy groups in the plurality of network policy groups, wherein the policy location for each of the network policy groups in the subset of network policy groups is the same as the first physical location and the policy role for each of the network policy groups in the subset of network policy groups is the same as the first user role;

comparing the priority information associated with each of the network policy groups from the subset of network policy groups; and selecting a highest priority network policy group from the subset of network policy groups as the first network policy group, the highest priority network policy group having a higher priority than other network policy groups in the subset of network policy groups based on the priority information associated with the highest priority network policy group.

11. The computer storage medium of claim 10, wherein each of the network policy groups in the plurality of network policy groups is linked to one of a plurality of user roles based on a network policy group name associated with the linked network policy group that is the same as a user role name associated with the linked user role, the first user role associated with the client device being one of the plurality of user roles.

12. The computer storage medium of claim 10, wherein the first policy location and the first physical location both comprise the same location name.

13. The computer storage medium of claim 10, wherein the first resource request comprises the first information.

14. The computer storage medium of claim 10, wherein the second network policy group is a default network policy group that applies to all client devices that connect to the network at the second physical location.

15. The computer storage medium of claim 10, wherein the second network policy group is more restrictive than the first network policy group for at least some of the resources available on the network.

16. The computer storage medium of claim 10, wherein the first access permissions allow the client device access to the requested resource and the second access permissions do not allow the client device access to the requested resource.

17. The computer storage medium of claim 10, wherein receiving the first information comprises:
receiving, from a specific network connection point on the network, client device information indicating that the client device is connected to the specific network connection point, wherein a plurality of network connection points provide access to the network and each network connection point is associated with a network connection point location, the specific network connection point location associated with the specific network connection point identifying the first physical location, and the specific network connection point being one of the plurality of network connection points.

18. The computer storage medium of claim 17, wherein the specific network connection point comprises a wireless network connection point.

19. A system comprising:
one or more computers and one or more storage devices storing instructions that are operable, when executed by the one or more computers, to cause the one or more computers to perform operations comprising:
receiving first information indicating that a client device is connected to a network at a first physical location, and identifying a first user role associated with the client device;
identifying, from among a plurality of network policy groups that each has a corresponding policy location and a corresponding policy role, a first network policy group having both (i) a first policy location that corresponds to the client device's first physical location, and (ii) a policy role that corresponds to the client device's first user role; and
receiving, from the client device while the client device is associated with the first physical location, a first resource request to access a resource available on the network;
determining, while the client device is associated with the first physical location and in response to receiving the first resource request, first access permissions for the client device to the requested resource using the first network policy group;
receiving second information indicating that the client device is connected to the network at a second physical location, and identifying a second user role associated with the client device, the second physical location different from the first physical location;
identifying, from among the plurality of network policy groups, a second network policy group having both (i) a second policy location that corresponds to the client device's second physical location, and (ii) a policy role that corresponds to the client device's second user role;
receiving, from the client device while the client device is associated with the second physical location, a second resource request to access the resource; and
determining, while the client device is associated with the second physical location and in response to receiving the second resource request, second access permissions for the client device to the requested resource using the second network policy group;
wherein identifying the first network policy group further comprises:
identifying a subset of network policy groups for the client device using the first user role and the first physical location, each of the network policy groups in the subset of network policy groups having priority information and being one of the network policy groups in the plurality of network policy groups, wherein the policy location for each of the network policy groups in the subset of network policy groups is the same as the first physical location and the policy role for each of the network policy groups in the subset of network policy groups is the same as the first user role;
comparing the priority information associated with each of the network policy groups from the subset of network policy groups; and
selecting a highest priority network policy group from the subset of network policy groups as the first network policy group, the highest priority network policy group having a higher priority than other network policy groups in the subset of network policy groups based on the priority information associated with the highest priority network policy group.

20. The system of claim 19, wherein receiving the first information comprises:
receiving, from a specific network connection point on the network, client device information indicating that the client device is connected to the specific network connection point, wherein a plurality of network connection points provide access to the network and each network connection point is associated with a network connection point location, the specific network connection point location associated with the specific network connection point identifying the first physical location, and the specific network connection point being one of the plurality of network connection points.

21. The system of claim 20, wherein the specific network connection point comprises a wireless network connection point.

22. The system of claim 19, wherein each of the network policy groups in the plurality of network policy groups is linked to one of a plurality of user roles based on a network policy group name associated with the linked network policy group that is the same as a user role name associated with the linked user rote, the first user role associated with the client device being one of the plurality of user roles.

23. The system of claim 19, wherein the first resource request comprises the first information.

24. The system of claim 19, wherein the second network policy group is a default network policy group that applies to all client devices that connect to the network at the second physical location.

25. The system of claim 19, wherein the second network policy group is more restrictive than the first network policy group for at least some of the resources available on the network.

26. The system of claim 19, wherein the first access permissions allow the client device access to the requested resource and the second access permissions do not allow the client device access to the requested resource.

27. The system of claim 19, wherein the first policy location and the first physical location both comprise the same location name.

* * * * *